US012791957B2

(12) United States Patent
Ogino et al.

(10) Patent No.: US 12,791,957 B2
(45) Date of Patent: Nov. 10, 2026

(54) TONER, DEVELOPER, TONER HOUSING UNIT, IMAGE FORMING APPARATUS, AND IMAGE FORMING METHOD

(71) Applicants: Kohtaroh Ogino, Shizuoka (JP); Yoshitaka Yamauchi, Shizuoka (JP); Masayuki Ishii, Shizuoka (JP); Ayaka Mori, Shizuoka (JP); Kazumi Suzuki, Shizuoka (JP)

(72) Inventors: Kohtaroh Ogino, Shizuoka (JP); Yoshitaka Yamauchi, Shizuoka (JP); Masayuki Ishii, Shizuoka (JP); Ayaka Mori, Shizuoka (JP); Kazumi Suzuki, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 711 days.

(21) Appl. No.: 18/086,687

(22) Filed: Dec. 22, 2022

(65) Prior Publication Data

US 2023/0205107 A1 Jun. 29, 2023

(30) Foreign Application Priority Data

Dec. 28, 2021 (JP) ................................ 2021-213635

(51) Int. Cl.
*G03G 9/087* (2006.01)
*G03G 9/08* (2006.01)

(52) U.S. Cl.
CPC ....... *G03G 9/08782* (2013.01); *G03G 9/0821* (2013.01)

(58) Field of Classification Search
CPC ........................ G03G 9/08782; G03G 9/0821
See application file for complete search history.

(56) References Cited

U.S. PATENT DOCUMENTS 10,754,270 B2 * 8/2020 Kitada ................. G03G 9/0821
2014/0356028 A1 * 12/2014 Yokoyama .............. G03G 9/12 399/237
2020/0272067 A1 8/2020 Ogino et al.
(Continued)

FOREIGN PATENT DOCUMENTS

CN 104007629 A * 8/2014
JP 4-362953 12/1992
(Continued)

OTHER PUBLICATIONS

CAS Registry for 64742-47-8 (Year: 2025).*
(Continued)

*Primary Examiner* — Peter L Vajda
*Assistant Examiner* — Jenna Kuipers
(74) *Attorney, Agent, or Firm* — XSENSUS LLP

(57) ABSTRACT

A toner includes a release agent. The release agent includes a hydrocarbon compound having 2 or more and 16 or less carbon atoms. A content of the hydrocarbon compound having 2 or more and 16 or less carbon atoms, in the release agent, is 1000 ppm or more in terms of toluene, as determined by gas chromatography mass spectrometry. The hydrocarbon compound having 2 or more and 16 or less carbon atoms includes a hydrocarbon compound having a retention time of 7 minutes or more and less than 8 minutes determined by the gas chromatography mass spectrometry.

16 Claims, 3 Drawing Sheets

(56) References Cited

U.S. PATENT DOCUMENTS

| | | | |
|---|---|---|---|
| 2020/0285168 | A1 | 9/2020 | Ishii et al. |
| 2020/0333720 | A1 | 10/2020 | Sawada et al. |
| 2020/0363743 | A1 | 11/2020 | Nakajima et al. |
| 2021/0026267 | A1 | 1/2021 | Hanatani et al. |
| 2022/0066344 | A1 | 3/2022 | Sawada et al. |

FOREIGN PATENT DOCUMENTS

| | | | | |
|---|---|---|---|---|
| JP | 7-140717 | | | 6/1995 |
| JP | 2005-189809 | | | 7/2005 |
| JP | 2008-262094 | | | 10/2008 |
| JP | 2008262094 | A | * | 10/2008 |

OTHER PUBLICATIONS

UnivarSolutions product page for EXSOL D110 (Year: 2025).*

ChemEurope Rice Bran Wax Encyclopedia page (Year: 2025).*

Tatsuura, Machine Translation of CN 104007629, Aug. 27, 2014 (Year: 2014).*

Toshiro, Machine Translation of JP 2008-262094A, Oct. 30, 2008 (Year: 2008).*

* cited by examiner

TONER, DEVELOPER, TONER HOUSING UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2021-213635, filed on Dec. 28, 2021, in the Japan Patent Office, the entire disclosure of which is hereby incorporated by reference herein.

BACKGROUND

Technical Field

The present disclosure relates to a toner, a developer, a toner housing unit, an image forming apparatus, and an image forming method.

Related Art

Conventionally, a method in which a member such as a heated roller or a belt is used to heat and melt toner to fix the toner is used as a method of fixing toner. However, there is a problem in that offset, which means that the toner is fused to the member, tends to occur. To prevent offset, a release agent is added to the toner.

SUMMARY

Embodiments of the present invention provide a toner including a release agent. The release agent includes a hydrocarbon compound having 2 or more and 16 or less carbon atoms, and a content of the hydrocarbon compound having 2 or more and 16 or less carbon 5 atoms, in the release agent, is 1000 ppm or more in terms of toluene, as determined by gas chromatography mass spectrometry. The hydrocarbon compound having 2 or more and 16 or less carbon atoms includes a hydrocarbon compound having a retention time of 7 minutes or more and less than 8 minutes determined by the gas chromatography mass spectrometry.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
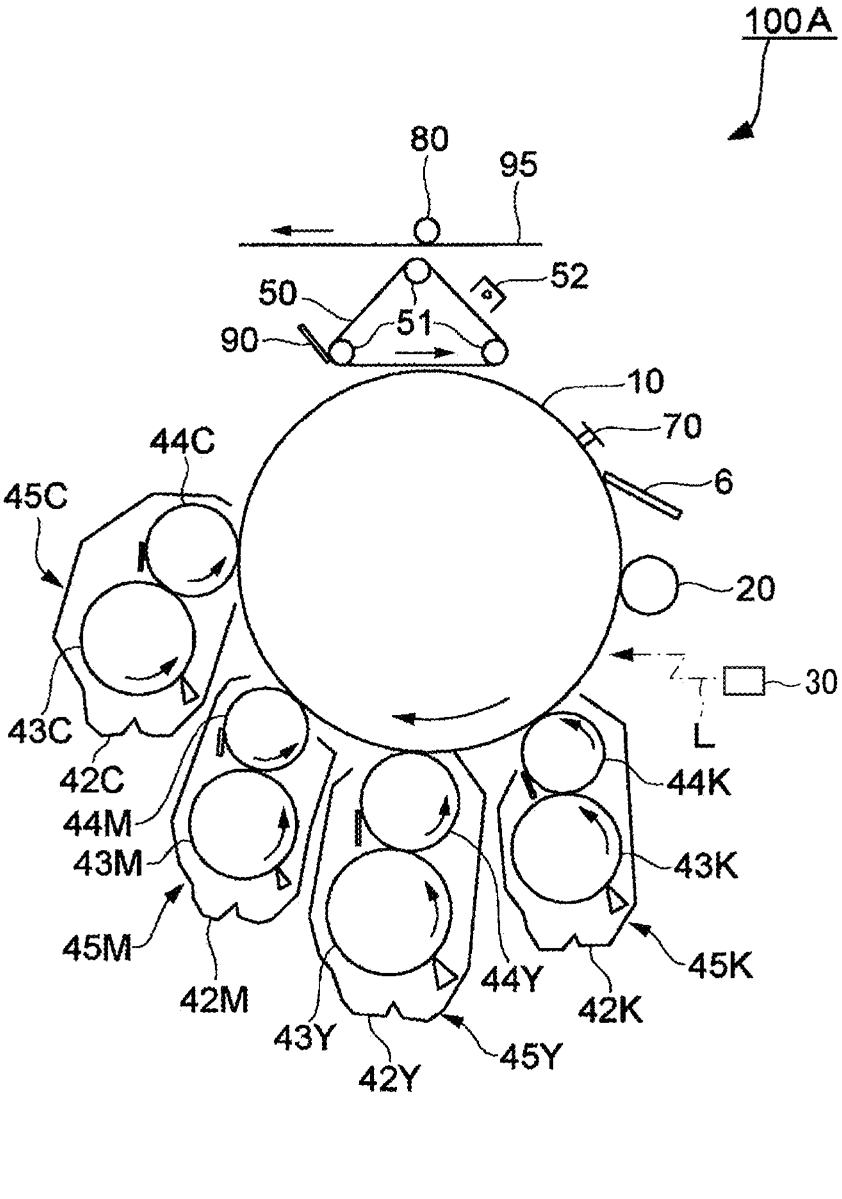
FIG. 1 is a schematic configuration diagram illustrating an example of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A release agent added to a toner is compatible with binder resins such as polyester resins and styrene resins, and thus, there is a problem in that the releasability of the release agent deteriorates.

In addition, if the proportion of the release agent present in the vicinity of a surface of toner particles increases, there is a problem in that, if the toner is used for a long time, the release agent may move toward a carrier or a photoconductor, which causes filming.

According to the present disclosure, it is possible to provide a toner having excellent filming resistance and heat-resistant storage stability.

(Toner)

The toner of the present disclosure contains a release agent, preferably contains a binder resin and a colorant, and may further contain other components, if desired.

The inventors of the present invention conducted extensive studies and found that, if a release agent contains 1000 ppm or more in terms of toluene of a hydrocarbon compound having 2 or more and 16 or less carbon atoms, interface tension of the release agent with respect to a binder resin is reduced, and thus the dispersibility of the release agent is 5 improved, and excellent filming resistance and heat-resistant storage stability are achieved.

In addition, the inventors of the present invention have found that, if the release agent contains a hydrocarbon compound having a retention time of 7 minutes or more and less than 8 minutes determined by gas chromatography mass spectrometry, the interface tension of the release agent with respect to the resin is reduced and the dispersibility of the release agent is improved, and thus excellent filming resistance and heat-resistant storage stability are achieved.

<Release Agent>

The release agent contains a hydrocarbon compound having 2 or more and 16 or less carbon atoms.

The content of the hydrocarbon compound having 2 or more and 16 or less carbon atoms is 1000 ppm or more, preferably from 1200 ppm to 8000 ppm, both inclusive, more preferably from 2500 ppm to 6500 ppm, both inclusive, and particularly preferably from 3000 ppm to 4000 ppm, both inclusive, in terms of toluene, with respect to the release agent. If the content is 1000 ppm or more, excellent filming resistance and heat-resistant storage stability are achieved.

The content is determined in terms of toluene by using a calibration curve of toluene.

In an example of a method for measuring the content, gas chromatography mass spectrometry can be used. Measurement devices used in the measurement and measurement conditions of the measurement are as follows.

[Measurement Device and Measurement Conditions]

Heat extraction device: PY2020D (manufactured by Frontier Laboratories Ltd.)

Heat extraction conditions: 150° C./5 min

Temperature of interface portion: 250° C.

Gas chromatograph mass spectrometer (detector): QP-2010 (manufactured by Shimadzu Corporation)

Column: UA-5 (manufactured by Frontier Laboratories Ltd., stationary phase: 5% diphenyldimethyl polysiloxane, length: 30 m, inner diameter: 0.25 mm, film thickness: 0.25 μm)

Injection temperature: 150° C.

Carrier gas (mobile phase): He

Flow rate of carrier gas: 1.0 mL/min

Ionization method: electron ionization (EI) method (70 eV)

Injection mode: Split (1:100)

Oven temperature: 50° C. (retention: 2 min), 320° C. (retention: 10 min), heating rate: 15° C./min It is preferable that the hydrocarbon compound having 2 or more and 16 or less carbon atoms includes a hydrocarbon compound having a retention time determined by gas chromatography mass spectrometry (hereinafter simply referred to as retention time) of 7 minutes or more and less than 8 minutes, and further includes a hydrocarbon compound having a retention time of 8 minutes or more and less than 9 minutes and a hydrocarbon compound having a retention time of 9 minutes or more and less than 10 minutes.

The retention time is the time from injecting a sample to be analyzed into an inlet port of a column, until each compound passes the column and a maximum peak of each compound is detected by a detector. The retention time in the present disclosure is a value measured by using the measurement device and the measurement conditions described above.

Examples of the hydrocarbon compound having a retention time of 7 minutes or more and less than 8 minutes include, but are not limited to, a hydrocarbon compound represented by the following molecular formula (1).

$C_7H_{14}O$ molecular formula (1)

Examples of the hydrocarbon compound represented by the molecular formula (1) include, but are not limited to, heptanones such as 2-heptanone, 3-heptanone, and 4-heptanone, cyclohexylmethanol, and heptanal.

Examples of the hydrocarbon compound having a retention time of 8 minutes or more and less than 9 minutes include, but are not limited to, a hydrocarbon compound represented by the following molecular formula (2).

$C_8H_{16}O$ molecular formula (2)

Examples of the hydrocarbon compound represented by the molecular formula (2) include, but are not limited to, octanones such as 2-octanone, 3-octanone, and 4-octanone, 4-methylcyclohexanemethanol, octanal, 1-octen-3-ol, and tetramethyltetrahydrofuran.

Examples of the hydrocarbon compound having a retention time of 9 minutes or more and less than 10 minutes include, but are not limited to, hydrocarbon compounds represented by the following molecular formula (3).

$C_9H_{18}O$ molecular formula (3)

Examples of the hydrocarbon compound represented by the molecular formula (3) include, but are not limited to, nonanones such as 2-nonanone, 3-nonanone, 4-nonanone, and 5-nonanone, nonanal, and 3,3,5-trimethylcyclohexanol.

The release agent preferably satisfies the following expression (1) and expression (2), where A is a peak area of a peak of the hydrocarbon compound having a retention time of 7 minutes or more and less than 8 minutes determined by the gas chromatography mass spectrometry, B is a peak area of a peak of the hydrocarbon compound having a retention time of 8 minutes or more and less than 9 minutes determined by the gas chromatography mass spectrometry, and C is a peak area of a peak of the hydrocarbon compound having a retention time of 9 minutes or more and less than 10 minutes determined by the gas chromatography mass spectrometry.

$A<B<C$ expression (1)

$2A<C$ expression (2)

When the release agent satisfies the expression (1), the toner has excellent heat-resistant storage stability.

When the release agent satisfies the expression (2), excellent high temperature offset resistance during fixing is achieved.

A melting point of the release agent is not particularly limited and may be appropriately selected depending on the purpose, however, the melting point is preferably 70° C. or higher, and more preferably 75° C. or higher. If the melting point is 70° C. or higher, excellent filming resistance and heat-resistant storage stability are achieved.

In a differential scanning calorimetry (DSC) curve measured by a differential scanning calorimeter, the release agent preferably has a maximum endothermic peak $P_1$ in a region from 70° C. to 90° C., both inclusive. Further, a maximum endothermic peak temperature $T_1$ indicating the maximum endothermic peak $P_1$ and a temperature $T_2$ that is lower than the maximum endothermic peak temperature $T_1$ and is the temperature at a depth of 10% of a maximum endothermic peak depth, are measured, and it is preferable that a temperature difference ($T_1$-$T_2$) between $T_1$ and $T_2$ is 10° C. or higher.

The measurement conditions of the differential scanning calorimeter are not 5 particularly limited and may be appropriately selected depending on the purpose. For example, according to JIS K 7121, after heating 2 mg of a sample to 180° C. at a heating rate of 10.0° C./min, the sample is held at a holding temperature of 180° C. for a holding time of 5 minutes, and then, the sample may be measured by using an endothermic curve in a second run.

The content of the release agent is not particularly limited and may be appropriately selected depending on the purpose. However, the content of the release agent is preferably 2 mass % or more and 10 mass % or less, and more preferably 3 mass % or more and 8 mass % or less, with respect to the toner. If the content is 2 mass % or more, high-temperature offset resistance and low-temperature fixability during fixing are excellent. If the content is 10 mass % or less, excellent heat-resistant storage stability is achieved, and fogging of images can be prevented.

Examples of the release agent include, but are not limited to, vegetable waxes such as rice wax.

As the release agent, an appropriately synthesized release agent may be used, or a commercially available release agent may be used.

As a method for synthesizing the release agent, for example, the following method may be used.

First, hexane is added to 100 g of unrefined rice bran, the mixture is heated at 80° C. to melt the rice bran, and then, the mixture is cooled at a temperature of 0° C. or higher and 30° C. or lower to obtain a crude wax.

Next, 1000 mL of ethanol are added to the obtained crude wax, the mixture is stirred by using a homogenizer in a stirring step, and then, the solution is cooled at 20° C. until the solution crystallizes. The crystallized solution is filtered and dried under reduced pressure at 40° C. for 24 hours to obtain the release agent.

The temperature of the ethanol is not particularly limited and may be appropriately selected depending on the purpose, however, the temperature of the ethanol is preferably 50° C. or higher, and more preferably 50° C. or higher and 75° C. or lower. If the temperature is 50° C. or higher, it is possible to obtain a release agent that can be suitably used in the toner of the present disclosure.

The number of stirring steps in the method for synthesizing the release agent is not particularly limited and may be appropriately selected depending on the purpose, but is preferably one or more and three or less. If the number is one or more and three or less, it is possible to obtain a release agent that can be suitably used in the toner of the present 5 disclosure.

Examples of the commercially available release agent include, but are not limited to, RBW101 (manufactured by Clariant Corp.).

The release agent may include a hydrocarbon compound other than the hydrocarbon compound having 2 or more and 16 or less carbon atoms.

The hydrocarbon compound other than the hydrocarbon compound having 2 or more and 16 or less carbon atoms is not particularly limited and may be appropriately selected depending on the purpose. Examples thereof include, but are not limited to, hydrocarbon compounds having 20 or more and 30 or less carbon atoms.

The hydrocarbon compound having 20 or more and 30 or less carbon atoms is not particularly limited and may be appropriately selected depending on the purpose. Examples thereof include, but are not limited to, a hydrocarbon compound represented by the following molecular formula (4).

$$C_{25}H_{52}O_2 \quad \text{molecular formula (4)}$$

<Binder Resin>

The binder resin is not particularly limited and may be appropriately selected depending on the purpose. Examples of the binder resin include, but are not limited to, styrene resins (homopolymers or copolymers containing styrene or substituted styrene), vinyl chloride resins, styrene/vinyl acetate copolymers, rosin-modified maleic acid resins, phenolic resins, epoxy resins, polyethylene resins, polypropylene resins, ionomer resins, polyurethane resins, silicone resins, ketone resins, ethylene/ethyl acrylate copolymers, xylene resins, polyvinyl butyral resins, petroleum-based resins, and hydrogenated petroleum-based resins.

Examples of the styrene resins (homopolymers or copolymers containing styrene or substituted styrene) include, but are not limited to, polystyrene, chloropolystyrene, poly-α-methylstyrene, a styrene/chlorostyrene copolymer, a styrene/propylene copolymer, a styrene/butadiene copolymer, a styrene/vinyl chloride copolymer, a styrene/vinyl acetate copolymer, a styrene/maleic acid copolymer, a styrene/acrylate copolymer (such as a styrene/methyl acrylate copolymer, a styrene/ethyl acrylate copolymer, a styrene/butyl acrylate copolymer, a styrene/octyl acrylate copolymer, and a styrene/phenyl acrylate copolymer), a styrene/methacrylate copolymer (such as a styrene/methyl methacrylate copolymer, a styrene/ethyl methacrylate copolymer, a styrene/butyl methacrylate copolymer, and a styrene/phenyl methacrylate copolymer), a styrene/methyl-α-chloroacrylate copolymer, and a styrene/acrylonitrile/acrylate copolymer.

Each of these styrene resins may be used alone or in combination with others. Among these styrene resins, polyester resins are preferable from the viewpoint of low-temperature fixability and environmental safety (volatile organic compounds (VOC) from residual monomers).

<<<Polyester Resin>>>

As the polyester resin, any known polyester resin obtained by a polycondensation reaction between an alcohol and a carboxylic acid may be used.

Examples of the alcohol include, but are not limited to, diols, etherified bisphenols, divalent alcohol monomers obtained by substituting these alcohols with a saturated or unsaturated hydrocarbon group having 3 to 22 carbon atoms, and higher alcohol monomers having a valence of 3 or higher.

Examples of the diols include, but are not limited to, polyethylene glycol, diethylene glycol, triethylene glycol, 1,2-propylene glycol, 1,3-propylene glycol, 1,4-propylene glycol, neopentyl glycol, and 1,4-butenediol.

Examples of the etherified bisphenols include, but are not limited to, 1,4-bis(hydroxymethyl)cyclohexane, bisphenol A, hydrogenated bisphenol A, polyoxyethylenated bisphenol A, and polyoxypropylenated bisphenol A.

Examples of the higher alcohol monomers having a valence of 3 or higher include, but are not limited to, sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Each of these alcohols may be used alone or in combination with others.

Examples of the carboxylic acid include, but are not limited to, monocarboxylic acids, divalent organic acid monomers, anhydrides of these acids, dimers of lower alkyl esters with linolenic acid, and polyvalent carboxylic acid monomers having a valence of 3 or higher.

Examples of the monocarboxylic acids include, but are not limited to, palmitic acid, stearic acid, and oleic acid.

Examples of the divalent organic acid monomers include, but are not limited to, maleic acid, fumaric acid, mesaconic acid, citraconic acid, terephthalic acid, cyclohexanedicarboxylic acid, succinic acid, adipic acid, sebacic acid, malonic acid, and compounds obtained by substituting these acids with a saturated or unsaturated hydrocarbon group having 3 to 22 carbon atoms.

Examples of the polyvalent carboxylic acid monomers having a valence of 3 or higher include, but are not limited to, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylate, EMPOL trimer acid, and anhydrides of these acids.

Each of these carboxylic acids may be used alone or in combination with others.

A method of producing the binder resin is not particularly limited and can be appropriately selected. Examples thereof include, but are not limited to, bulk polymerization, solution polymerization, emulsion polymerization, and suspension polymerization.

<Colorant>

Known dyes and pigments may be used as the colorant used in the toner of the present disclosure. Examples thereof include, but are not limited to, dyes and pigments such as carbon black, lamp black, iron black, aniline blue, phthalocyanine blue, phthalocyanine green, Hansa yellow G, Rhodamine 6C lake, Calco oil blue, chrome yellow, quinacridone, benzidine yellow, rose bengal, and triarylmethane dyes. Each of these colorants can be used alone or in combination with others. The colorants may be used in a black toner or a full-color toner.

The content of these colorants is preferably from 1 mass % to 30 mass %, and more preferably from 3 mass % to 20 mass %, with respect to binder resin components in the toner.

<<<Trivalent or Higher Metal Salt>>>

The toner of the present disclosure preferably contains a trivalent or higher metal salt. If the metal salt is provided, a cross-linking reaction proceeds with acidic groups of the binder resin during fixing, so that weak three-dimensional cross-links are formed, and thus, high-temperature offset resistance can be obtained while maintaining low-temperature fixability.

Examples of the metal salt preferably include at least one type selected from metal salts of salicylic acid derivatives and metal salts of acetylacetonate. The metal is not particularly limited as long as the metal is a polyvalent ion metal having a valence of 3 or higher. Examples thereof include, but are not limited to, iron, zirconium, aluminum, titanium, and nickel.

As the trivalent or higher metal salt, a trivalent or higher salicylate metal compound is preferable.

The content of the metal salt is preferably 0.5 parts by mass to 2 parts by mass, and more preferably 0.5 parts by mass to 1 part by mass, with respect to 100 parts by mass of the toner. From the viewpoint of hot offset resistance, glossiness, and low-temperature fixability, the content of the metal salt is preferably 0.5 parts by mass to 2 parts by mass.

<Other Components>

The other components are not particularly limited and may be appropriately selected depending on the purpose. Examples of the other components include, but are not limited to, resin microparticles, charge control agents, external additives, fluidity improvers, cleanability improvers, and magnetic materials.

—Resin Microparticles—

The resin of the resin microparticles is not particularly limited, as long as the resin forms an aqueous dispersion liquid in an aqueous medium, and can be appropriately selected from known resins depending on the purpose. Thermoplastic resins and thermosetting resins may be used as the resin of the resin microparticles. Examples thereof include, but are not limited to vinyl resins, polyurethane resins, epoxy resins, polyester resins, polyamide resins, polyimide resins, silicon resins, phenolic resins, melamine resins, urea resins, aniline resins, ionomer resins, and polycarbonate resins. Each of these may be used alone or in combination with others. Among these resins, the resin microparticles are preferably formed by at least one type selected from a vinyl resin, a polyurethane resin, an epoxy resin, and a polyester resin, from the viewpoint that an aqueous dispersion liquid of fine spherical resin microparticles can be easily obtained. The vinyl resin refers to a polymer of homopolymerized or copolymerized vinyl monomers. Specific examples of the vinyl resin include, but are not limited to, a styrene-(meth)acrylate resin, a styrene-butadiene copolymer, a (meth)acrylic acid-acrylate polymer, a styrene-acrylonitrile copolymer, a styrene-maleic anhydride copolymer, and a styrene-(meth)acrylic acid copolymer.

—Charge Control Agent—

The charge control agent is not particularly limited and can be appropriately selected depending on the purpose. Examples thereof include, but are not limited to, nigrosine dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, elemental phosphorus or compounds of phosphorus, elemental tungsten or compounds of tungsten, active agents of fluorine, metal salts of salicylic acid, and metal salts of salicylic acid derivatives. Specific examples of the charge control agent include, but are not limited to, a nigrosine dye, BONTRON 03; a quaternary ammonium salt, BONTRON P-51; a metal-containing azo dye, BONTRON S-34; an oxynaphthoic acid-based metal complex, E-82; a salicylic acid-based metal complex, E-84; and a phenolic condensate, E-89 (all manufactured by Orient Chemical Industries Co., Ltd.); quaternary ammonium salt molybdenum complexes, TP-302 and TP-415 (both manufactured by Hodogaya Chemical Co., Ltd.); LRA-901; a boron complex, LR-147 (manufactured by Japan Carlit Co., Ltd.); copper phthalocyanine; perylene; quinacridone; azo-pigments; and other polymeric compounds having a functional group such as a sulfonic acid group, a carboxyl group, and a quaternary ammonium salt.

—External Additive—

The external additive is not particularly limited and may be appropriately selected depending on the purpose. Examples of the external additive include, but are not limited to, fatty acid metal salts such as zinc stearate and aluminum stearate, metal oxides such as titania, alumina, tin oxide, antimony oxide, and titanium oxide, silica, hydrophobic silica, and fluoropolymers. Among these external additives, hydrophobic silica, titania, titanium oxide, and alumina are preferred.

Silica and titanium oxide are preferably surface-treated with a later-described fluidity improver, and used as hydrophobic silica and hydrophobic titanium oxide.

Examples of the silica include, but are not limited to, R972, R974, RX200, RY200, R202, R805, and R812 (all manufactured by Nippon Aerosil Co., Ltd.).

Examples of the titania include, but are not limited to, P-25 (manufactured by Nippon Aerosil Co., Ltd.), STT-30 and STT-65C-S (both manufactured by Titan Kogyo, Ltd.), TAF-140 (manufactured by Fuji Titanium Industry Co., Ltd.), and MT-150W, MT-500B, MT-600B, and MT-150A (all manufactured by Tayca Co., Ltd.).

Examples of the titanium oxide include, but are not limited to, T-805 (manufactured by Nippon Aerosil Co., Ltd.), STT-30A and STT-65S-S (both manufactured by Titan Kogyo, Ltd.), TAF-500T and TAF-1500T (both manufactured by Fuji Titanium Industry Co., Ltd.), MT-100S and MT-100T (both manufactured by Tayca Co., Ltd.), and IT-S (manufactured by Ishihara Sangyo Kaisha, Ltd.).

—Fluidity Improver—

The fluidity improver is not particularly limited and may be appropriately selected depending on the purpose, as long as the fluidity improver can be used for a surface treatment to increase the hydrophobicity and prevent the deterioration of fluidity characteristics and charging characteristics even under high humidity. Examples of the fluidity improver include, but are not limited to, a silane coupling agent, a silylating agent, a silane coupling agent having a fluorinated alkyl group, an organic titanate-based coupling agent, an aluminum-based coupling agent, silicone oil, and modified silicone oil.

—Cleanability Improver—

The cleanability improver is not particularly limited and may be appropriately selected depending on the purpose, as long as the cleanability improver is added to the toner to remove developer remaining on a photoconductor or a primary transfer medium after transfer. Examples of the cleanability improver include zinc stearate, calcium stearate, metal salts of fatty acids such as stearic acids, and polymer microparticles manufactured by soap-free emulsion polymerization such as polymethyl methacrylate microparticles and polystyrene microparticles. Such polymer microparticles preferably have a relatively narrow particle size distribution, and preferably have a volume average particle diameter of 0.01 μm to 1 μm.

—Magnetic Material—

The magnetic material is not particularly limited, and may be appropriately selected depending on the purpose, and examples thereof include, but are not limited to, iron powder, magnetite, and ferrite. Among these magnetic materials, a white magnetic material is preferable in terms of color tone.

<Method of Manufacturing Toner>

A method of manufacturing the toner is not particularly limited and may be appropriately selected depending on the purpose.

Specific examples thereof include a kneading/pulverization method, a dissolution suspension method, and an emulsion aggregation method.

For example, in the kneading/pulverizing method, toner is manufactured as follows.

A binder resin solution, a pigment dispersion liquid, and a release agent dispersion liquid are mixed, premixed by using a HENSCHEL mixer, and then, melted and kneaded at a temperature of 120° C. by using a twin-screw kneader (PCM-30, manufactured by Ikegai Co., Ltd.). The obtained kneaded material is rolled by using a roller, cooled to room temperature by a belt cooler, and the rolled kneaded material is coarsely pulverized to sizes of 200 μm or more and 300 μM or less by using a hammer mill. Next, the resultant particles are finely pulverized by using a supersonic jet pulverizer (LABJET, manufactured by Nippon Pneumatic Mfg. Co., Ltd.). Subsequently, an air flow classifier (MDS-I, manufactured by Nippon Pneumatic Mfg. Co., Ltd.) is used to classify the pulverized particles while adjusting the air flow classifier to obtain a weight average particle diameter of 5.8±0.2 μm, to obtain the toner.

(Developer)

The developer of the present disclosure contains at least the toner of the present disclosure, and may contain other known components such as a carrier, if desired.

The developer may be a one-component developer or a two-component developer. The two-component developer is more preferable, because the life span of the developer is improved when such a developer is used in a high-speed printer and the like adapted for an improvement in information processing speed.

<Carrier>

The carrier is not particularly limited and may be appropriately selected depending on the purpose. However, a carrier including a core material and a resin layer covering the core material is preferable.

—Core Material—

The core material is not particularly limited and can be appropriately selected depending on the purpose. Examples of the core material include, but are not limited to, strongly magnetized materials such as manganese-strontium based materials of 50 emu/g to 90 emu/g, manganese-magnesium based materials of 50 emu/g to 90 emu/g, iron powder of 100 emu/g or more, and magnetite of 75 emu/g to 120 emu/g; and weakly magnetized materials such as copper-zinc based materials of 30 emu/g to 80 emu/g. Each of the core materials may be used alone or in combination with others.

The volume average particle diameter of the core material is not particularly limited and may be appropriately selected depending on the purpose, but is preferably 10 μm or more and 150 μm or less, and more preferably 40 μm or more and 100 μm or less. If the volume average particle diameter is 10 μm or more, it is possible to prevent an increase in the number of fine particles in the carrier and a decrease in the magnetization per particle, and thus, it is possible to effectively prevent the problem of carrier scattering. If the volume average particle diameter is 150 μm or less, the specific surface area may decrease and the toner may scatter. In particular, when a full-color image with many solid portions is printed, the problem of poor reproduction of the solid portions can be effectively prevented.

The toner of the present disclosure may be mixed with the carrier to be used as a developer.

(Toner Housing Unit)

In the present disclosure, a toner housing unit refers to a unit having a function of housing a toner and housing the toner therein. Here, examples of the toner housing unit include, but are not limited to, a toner housing container, a developing device, and a process cartridge.

The developing device refers to a device including a unit for housing and developing the toner.

The process cartridge refers to a cartridge that is obtained by integrating at least an electrostatic latent image bearer (also referred to as image bearer) and a developing unit, that 5 houses the toner, and that is attachable to and detachable from an image forming apparatus.

The process cartridge may further include at least one selected from a charging unit, an exposure unit, and a cleaning unit.

With an image forming apparatus mounted with the toner housing unit of the present disclosure, it is possible to take advantage of the characteristics of the toner, such as excellent low-temperature fixability and heat-resistant storage stability, as well as excellent image quality, in image forming.

(Image Forming Apparatus and Image Forming Method)

The image forming apparatus of the present disclosure includes at least an electrostatic latent image bearer, an electrostatic latent image forming unit, and a developing unit, and may further include other known units, if desired.

The image forming method relating to the present disclosure includes at least an electrostatic latent image forming step and a developing step, and may further include other known steps, if desired.

The image forming method can be preferably performed by the image forming apparatus, the electrostatic latent image forming step can be preferably performed by the electrostatic latent image forming unit, and the developing step can be preferably performed by the developing unit. The other known steps can be preferably performed by the other known units.

The image forming apparatus of the present disclosure preferably includes an electrostatic latent image bearer, an electrostatic latent image forming unit that forms an electrostatic latent image on the electrostatic latent image bearer, a developing unit that houses a toner and develops the electrostatic latent image formed on the electrostatic latent image bearer by using the toner to form a toner image, a transfer unit that transfers the toner image formed on the electrostatic latent image bearer onto a surface of a recording medium, and a fixing unit that fixes the toner image transferred onto the surface of the recording medium.

The image forming method of the present disclosure preferably includes an electrostatic latent image forming step of forming an electrostatic latent image on an electrostatic latent image bearer, a developing step of developing the electrostatic latent image formed on the electrostatic latent image bearer by using a toner to form a toner image, a transferring step of transferring the toner image formed on the electrostatic latent image bearer onto a surface of a recording medium, and a fixing step of fixing the toner image transferred onto the surface of the recording medium.

In the developing unit and the developing step, the toner of the present disclosure is used and the developer is preferably used.

Next, an example of implementing a method of forming an image by the image forming apparatus of the present disclosure will be described with reference to FIG. 1. An image forming apparatus 100A illustrated in FIG. 1 includes a photoconductor drum 10 as an electrostatic latent image bearer, a charging roller 20 as a charging unit, an exposure device 30 as an exposure unit, developing devices 45K, 45Y, 45M, and 45C for black (K), yellow (Y), magenta (M), and cyan (C) as developing units, an intermediate transfer body 50, a cleaning device 6 including a cleaning blade as a cleaning unit, and a static eliminator lamp 70 as a static elimination unit.

The intermediate transfer body 50 is an endless belt, is stretched by three rollers 51 arranged inside the intermediate transfer body 50, and is movable in a direction indicated by an arrow. One or two of the three rollers 51 also function(s) as transfer bias roller(s) applying a predetermined transfer bias (a primary transfer bias) to the intermediate transfer body 50.

In the vicinity of the intermediate transfer body 50, a cleaning device 90 including a cleaning blade is arranged. A transfer roller 80 as a transfer unit applying a transfer bias for transferring (secondarily transferring) the toner image to a recording sheet 95 is arranged to face the intermediate transfer body 50.

In the vicinity of the intermediate transfer body 50, a corona charger 52 that applies a charge to the toner image on the intermediate transfer body 50 is arranged between a contact portion of the intermediate transfer body 50 with the photoconductor drum 10 and a contact portion of the intermediate transfer body 50 with the recording sheet 95.

The developing devices 45K, 45Y, 45M, and 45C (hereinafter) for the respective colors black (K), yellow (Y), magenta (M), and cyan (C) include developer housing portions 42K, 42Y, 42M, and 42C, developer supply rollers 43K, 43Y, 43M, and 43C, and developing rollers 44K, 44Y, 44M, and 44C, respectively.

In the image forming apparatus 100A, the photoconductor drum 10 is uniformly charged by the charging roller 20, and then, the exposure device 30 exposes the photoconductor drum 10 to exposure light L so that an electrostatic latent image is formed on the photoconductor drum 10. Next, a developer is supplied from the developing device 45 to develop the electrostatic latent image formed on the photoconductor drum 10, to form a toner 5 image. Subsequently, the toner image is transferred (primarily transferred) onto the intermediate transfer body 50 by a transfer bias applied from the roller 51. The toner image on the intermediate transfer body 50 is charged by the corona charger 52 and then, transferred (secondarily transferred) onto the recording sheet 95. Residual toner remaining on the photoconductor drum 10 is removed by the cleaning device 6 and the charge of the photoconductor drum 10 is temporarily removed by the static eliminator lamp 70.

Figure 2:
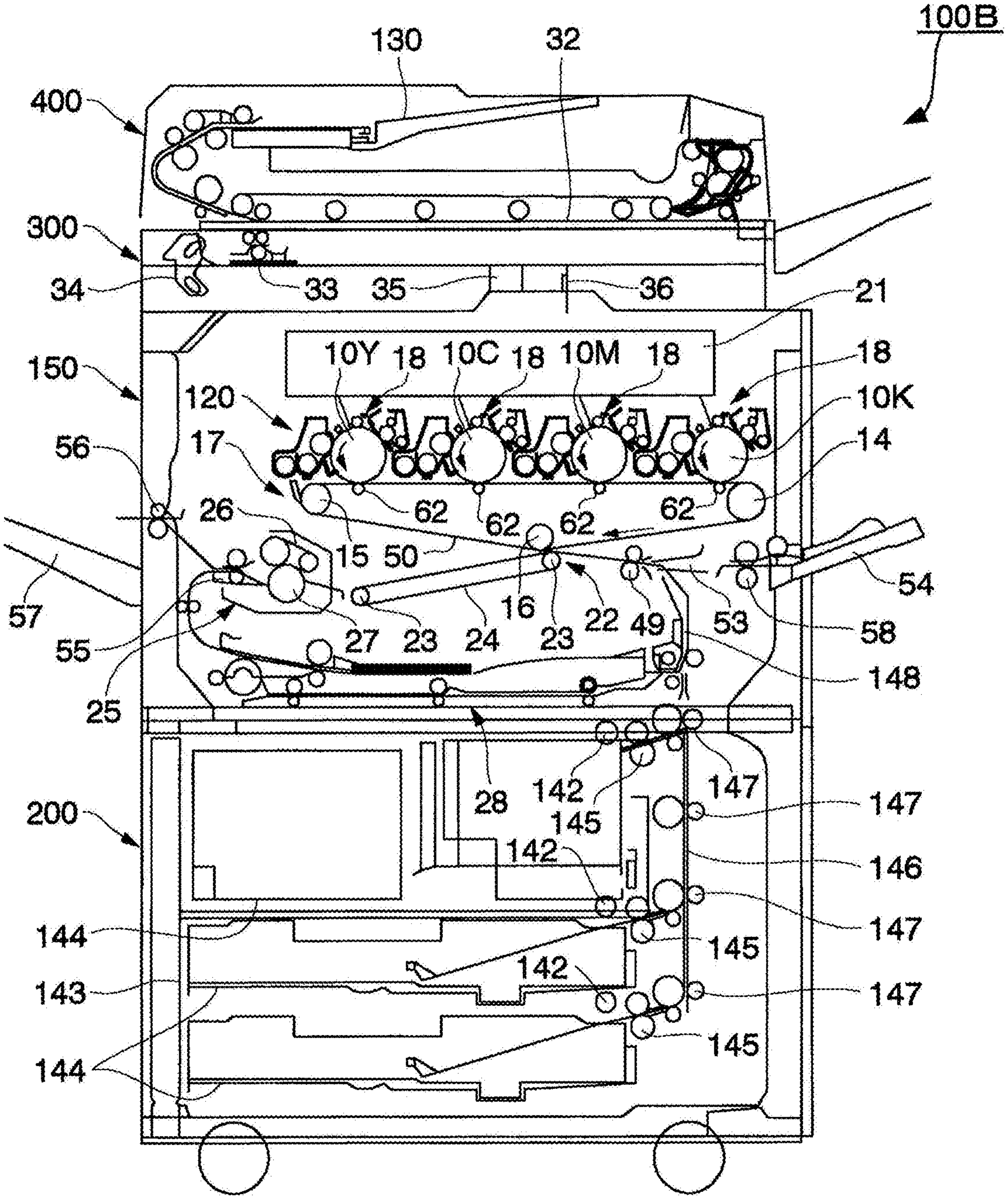
FIG. 2 is a schematic configuration diagram illustrating another example of the image forming apparatus according to an embodiment of the present disclosure.

FIG. 2 is a diagram illustrating another example of the image forming apparatus of the present disclosure. An image forming apparatus 100B is a tandem-type color image forming apparatus that includes a copying device main body 150, a sheet feeding table 200, a scanner 300, and an automatic document feeder (ADF) 400.

An intermediate transfer body 50 formed by an endless belt is provided in a center portion of the copying device main body 150. The intermediate transfer body 50 is stretched around support rollers 14, 15, and 16 and is rotatable in the direction of an arrow.

In the vicinity of the support roller 15, a cleaning device 17 for removing toner remaining on the intermediate transfer body 50 is arranged. A tandem-type developing device 120 in which image forming units 18 of each color (black (K), yellow (Y), magenta (M), and cyan (C)) are arranged facing each other, is arranged along a conveyance direction of the intermediate transfer body 50 stretched between the support roller 14 and the support roller 15.

Figure 3:
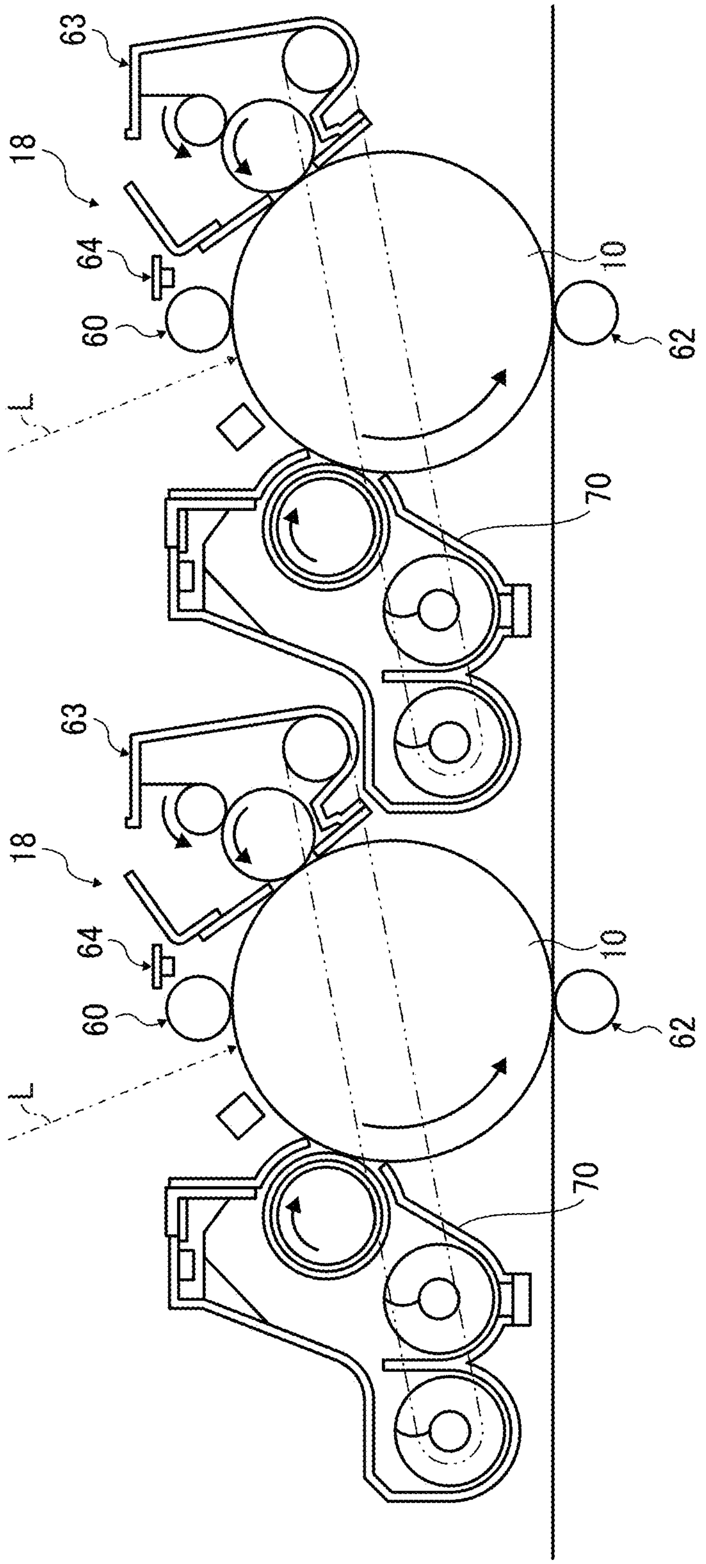
FIG. 3 is a schematic configuration diagram illustrating an example of an image forming unit for each color.

As illustrated in FIG. 3, each of the image forming units 18 of the respective colors includes a photoconductor drum 10, a charging roller 60 that uniformly charges the photoconductor drum 10, a developing device 70 that develops, by a developer of the corresponding color (black (K), yellow (Y), magenta (M), and cyan (C)), an electrostatic latent image formed on the photoconductor drum 10 to form a toner image, a transfer roller 62 that transfers the toner image of the corresponding color onto the intermediate transfer body 50, a cleaning device 63, and a static eliminator lamp 64.

In the image forming apparatus of FIG. 2, an exposure device 21 is arranged in the vicinity of the tandem-type developing device 120. The exposure device 21 exposes the photoconductor drum 10 to exposure light to form an electrostatic latent image.

A secondary transfer device 22 is arranged opposite to the tandem-type developing device 120 relative to the intermediate transfer body 50. The secondary transfer device 22 includes a secondary transfer belt 24, which is an endless belt stretched around a pair of rollers 23, and a recording sheet conveyed on the secondary transfer belt 24 may contact the intermediate transfer body 50.

In the vicinity of the secondary transfer device 22, a fixing device 25 is arranged. The fixing device 25 includes a fixing belt 26 that is an endless belt, and a pressure roller 27 that is arranged to be pressed against the fixing belt 26.

In the vicinity of the secondary transfer device 22 and the fixing device 25, a reversing device 28 is arranged for reversing the recording sheet to form images on both sides of the recording sheet.

Next, the formation of a full-color image (color copying) by the image forming apparatus 100B will be described. Firstly, a document is set on a document platen 130 of the automatic document feeder (ADF) 400, or the automatic document feeder 400 is opened to set the document on a contact glass 32 of the scanner 300, and the automatic document feeder 400 is closed. When a start switch is pressed, the scanner 300 starts driving after the document is moved onto the contact glass 32 in a case where the document is set on the automatic document feeder 400. On the other hand, the scanner 300 immediately starts driving in a case where the document is set on the contact glass 32. After that, a first traveling body 33 and a second traveling body 34 start traveling. At this time, the first traveling body 33 emits light from a light source. Reflected light reflected from a document surface is reflected by a mirror in the second traveling body 34, passes an imaging forming lens 35, and is received by a reading sensor 36. As a result, the color document (color image) is read and image information of each color including black, yellow, magenta, and cyan is obtained.

The exposure device 21 forms an electrostatic latent image of each color on the photoconductor drums 10Y, 10C, 10M, and 10K, based on the obtained image information of each color, and then, the electrostatic latent image of each color is developed by the developer supplied from the developing device 120 of each color to form a toner image of each color. The formed toner images of the respective colors are successively superimposed and transferred (primarily transferred) onto the intermediate transfer body 50 that is rotated and moved by the support rollers 14, 15, and 16, and thus, a composite toner image is formed on the intermediate transfer body 50.

In the sheet feeding table 200, one of sheet feeding rollers 142 is selectively rotated to feed the recording sheet from one of sheet feeding cassettes 144 provided in a plurality of stages in a paper bank 143. Next, the sheets are separated one by one by a separation roller 145, transported to a sheet feeding path 146, conveyed by a conveyance roller 147, and guided to a sheet feeding path 148 in the copying device main body 150. Subsequently, the sheet abuts against a registration roller 49 and is stopped. In another case where recording sheets on a manual sheet feeding tray 54 is fed, the recording sheets are separated one by one by a separation roller 58, and inserted into a manual-feeding sheet feeding path 53.

Subsequently, the sheet abuts against the registration roller 49 and is stopped. The registration roller 49 is generally grounded and used. However, the registration roller 49 may be used in a state where a bias for removing paper powder from the recording sheet is applied to the registration roller 49.

Next, the registration roller 49 is rotated at a timing synchronized with the composite toner image formed on the intermediate transfer body 50 to transport the recording sheet to an area between the intermediate transfer body 50 and the secondary transfer device 22, and thus, the composite toner image is transferred (secondarily transferred) onto the recording sheet.

The recording sheet onto which the composite toner image is transferred is conveyed by the secondary transfer device 22 and transported to the fixing device 25. In the fixing device 25, the fixing belt 26 and the pressure roller 27 apply heat and pressure to fix the composite toner image on the recording sheet. Subsequently, the recording sheet is switched by a switching claw 55 and discharged by a discharge roller 56 to be stacked on a sheet ejection tray 57. Alternatively, the sheet is switched by the switching claw 55, reversed by the reversing device 28, and guided again to a transfer position. An image is formed also on a back side of the sheet, and then, the sheet is discharged by the discharge roller 56 to be stacked on the sheet ejection tray 57.

After the composite toner image is transferred, toner remaining on the intermediate transfer body 50 is removed by the cleaning device 17.

EXAMPLES

The present disclosure will be described in detail below with reference to Examples. However, the present disclosure is not limited to these Examples.

<Synthesis Example of Amorphous Polyester Resin>

A bisphenol A ethylene oxide 2-mole adduct, a bisphenol A propylene oxide 3-mole adduct, terephthalic acid, adipic acid, and trimethylolpropane were placed in a four-necked flask equipped with a nitrogen inlet tube, a desiccation tube, a stirrer, and a thermocouple. The mole ratio of the bisphenol A ethylene oxide 2-mole adduct and the bisphenol A propylene oxide 3-mole adduct (bisphenol A ethylene oxide 2 mole-adduct/bisphenol A propylene oxide 3 mole-adduct) was 85/15. The mole ratio of terephthalic acid and adipic acid (terephthalic acid/adipic acid) was 75/25, and the amount of trimethylolpropane in all monomers was 1 mol %. The mixture was prepared so that the mole ratio of hydroxyl groups to carboxyl groups represented by OH/COOH, was 1.2. The mixture was allowed to react in the presence of titanium tetraisopropoxide (500 ppm relative to the resin components) at normal pressure at 230° C. for 8 hours, and further allowed to react at a reduced pressure of 10 mmHg to 15 mmHg for 4 hours. Then, trimellitic anhydride in an amount of 1 mol % with respect to the total resin components was added into a reaction vessel, and the mixture was allowed to react at 180° C. and normal pressure for 3 hours to obtain an [amorphous polyester resin].

<Synthesis Example of Crystalline Polyester Resin>

Sebacic acid and 1,6-hexanediol were placed into a 5 L four-necked flask equipped with a nitrogen inlet tube, a desiccation tube, a stirrer, and a thermocouple, so that a mole ratio of hydroxyl groups and carboxyl groups represented by OH/COOH, was 0.9. The mixture was allowed to react in the presence of titanium tetraisopropoxide (500 ppm with respect to the resin components) at 180° C. for 10 hours. Then, the mixture was further allowed to react at an increased temperature of 200° C. for 3 hours, and react at a pressure of 8.3 kPa for 2 hours. As a result, a crystalline polyester resin was obtained.

60 parts by mass of the [crystalline polyester resin] and 400 parts by mass of ethyl acetate were placed into a container equipped with a stirring rod and a thermometer. The temperature was raised to 80° C. while stirring, and maintained at 80° C. for 5 hours. After that, the mixture was cooled to 30° C. in one hour. Subsequently, a bead mill (ULTRA VISCO MILL, manufactured by Aimex Co., Ltd.) was used to disperse the mixture under conditions including a liquid feed rate of 1 kg/hr, a disk peripheral speed of 6 m/sec, a filling degree of 80 vol % of zirconia beads having a diameter of 0.5 mm, and three passes to obtain a [crystalline polyester resin dispersion liquid].

<Rice Wax Synthesis Example 1>

Hexane was added to 100 g of unrefined rice bran, the mixture was heated at 80° C. to melt the rice bran, and then, the mixture was cooled at a temperature of 0° C. or higher and 30° C. or lower to obtain a crude wax.

Next, 1000 mL of ethanol heated to 60° C. were added to the obtained crude wax, the mixture was stirred in one stirring process by using a homogenizer, and then, the solution was cooled at 20° C. until the solution crystallized. The crystallized solution was filtered and dried under reduced pressure at 40° C. for 24 hours to obtain [rice wax 1].

The obtained [rice wax 1] was analyzed by the gas chromatography mass spectrometry indicated below, and the content of a hydrocarbon compound having 2 or more and 16 or less carbon atoms was determined as 3000 ppm in terms of toluene in the [rice wax 1]. When A is defined as the peak area of a peak of a hydrocarbon compound having a retention time of 7 minutes or more and less than 8 minutes, B is defined as the peak area of a peak of a hydrocarbon compound having a retention time of 8 minutes or more and less than 9 minutes, and C is defined as the peak area of a peak of a hydrocarbon compound having a retention time of 9 minutes or more and less than 10 minutes, the ratio of the peak areas (A:B:C) was 1.0:5.4:10.3. As a result of the gas chromatography mass spectrometry, it was confirmed that the [rice wax 1] contained a hydrocarbon compound having 20 or more and 30 or less carbon atoms.

The melting point of the obtained [rice wax 1] was measured by a method described below, and the measurement indicated a melting point of 75° C.

Further, a method described below was used to measure a temperature difference between a temperature $T_1$ and a temperature $T_2$ ($T_1$-$T_2$) of the obtained [rice wax 1] in a DSC curve measured by a differential scanning calorimeter, where $T_1$ is a maximum endothermic peak temperature indicating a maximum endothermic peak $P_1$, and $T_2$ is a temperature that is lower than the maximum endothermic peak temperature $T_1$ and is the temperature at a depth of 10% of the maximum endothermic peak depth. The temperature difference of the obtained [rice wax 1] was 20° C.

<Gas Chromatography Mass Spectrometry>

The obtained [rice wax 1] was analyzed by gas chromatography mass spectrometry using a measurement device and measurement conditions described below.

[Measurement Device and Measurement Conditions]

Heat extraction device: PY2020D (manufactured by Frontier Laboratories Ltd.)

Heat extraction conditions: 150° C./5 min

Temperature of interface portion: 250° C.

Gas chromatograph mass spectrometer (detector): QP-2010 (manufactured by Shimadzu Corporation)

Column: UA-5 (manufactured by Frontier Laboratories Ltd., stationary phase: 5% diphenyldimethyl polysiloxane, length: 30 m, inner diameter: 0.25 mm, film thickness: 0.25 μm)

Injection temperature: 150° C.

Carrier gas (mobile phase): He

Flow rate of carrier gas: 1.0 mL/min

Ionization method: EI method (70 eV)

Injection mode: Split (1:100)

Oven temperature: 50° C. (retention: 2 min), 320° C. (retention: 10 min), heating rate: 15° C./min <Measurement Method of Melting Point>

The melting point was measured by using a differential scanning calorimeter (DSC) system ("Q-200", manufactured by TA Instruments).

Specifically, about 5.0 mg of a target sample were placed into a sample container made from aluminum, the sample container was placed on a holder unit, and the holder unit was placed in an electric furnace. Next, in a nitrogen atmosphere, the sample was heated from −80° C. to 150° C. at a heating rate of 10° C./min (first heating). Subsequently, the sample was cooled from 150° C. to −80° C. at a cooling rate of 10° C./min, and again heated to 150° C. at a heating rate of 10° C./min (second heating). In each of the first heating and the second heating, a DSC curve was obtained by a differential scanning calorimeter ("Q-200", manufactured by TA Instruments).

An analysis program in the Q-200 system was used to select, from the obtained DSC curves, a DSC curve during the first heating, and an endothermic peak top temperature of the target sample in the first heating was determined as the melting point. Similarly, a DSC curve during the second heating was selected to determine an endothermic peak top temperature in the second heating of the target sample as the melting point.

<Measurement Method of Maximum Endothermic Peak Temperature $T_1$, Temperature $T_2$ at 10% Depth of Maximum Endothermic Peak Depth, and Difference ($T_1$-$T_2$)>

In a DSC measurement of the obtained [rice wax 1], a sample amount of 2 mg was used, the heating rate was 10.0° C./min, the holding temperature was 180° C., and the holding time was 5 minutes. The endothermic curve of the second run was used to measure the maximum endothermic peak temperature $T_1$ and the temperature $T_2$ that is lower than the maximum endothermic peak temperature $T_1$ and is the temperature at a depth of 10% of the maximum endothermic peak depth, and to determine the temperature difference ($T_1$-$T_2$) between $T_1$ and $T_2$. Similarly as in the DSC measurement of the binder resin, an automatic differential scanning calorimeter DSC-60A manufactured by Shimadzu Corporation was used as the differential scanning calorimeter.

<Rice Wax Synthesis Example 2>

A similar method as in the rice wax synthesis example 1 was used to synthesize [rice wax 2], except that the step of adding 1000 mL of ethanol heated to 60° C. and stirring by using a homogenizer in the rice wax synthesis example 1 was performed twice.

The obtained [rice wax 2] was analyzed by gas chromatography mass spectrometry using a method similar to the [rice wax 1], and the content of a hydrocarbon compound having 2 or more and 16 or less carbon atoms was determined as 1500 ppm in terms of toluene in the [rice wax 2]. The ratio of the peak areas (A:B:C) was 1.0:2.9:4.7.

The melting point of the obtained [rice wax 2] was measured by a method similar to the [rice wax 1], and the measurement indicated a melting point of 70° C. As a result of gas chromatography mass spectrometry, it was confirmed that the [rice wax 2] contained a hydrocarbon compound having 20 or more and 30 or less carbon atoms.

The temperature difference between $T_1$ and $T_2$ in the obtained [rice wax 2] was measured by a method similar to the [rice wax 1], and the measurement indicated a temperature difference of 17° C.

<Rice Wax Synthesis Example 3>

A similar method as in the rice wax synthesis example 1 was used to synthesize [rice wax 3], except that the step of adding 1000 mL of ethanol heated to 60° C. and stirring by using a homogenizer in the rice wax synthesis example 1 was performed three times.

The obtained [rice wax 3] was analyzed by gas chromatography mass spectrometry using a method similar to the [rice wax 1], and the content of a hydrocarbon compound having 2 or more and 16 or less carbon atoms was determined as 1856 ppm in terms of toluene in the [rice wax 3]. The ratio of the peak areas (A:B:C) was 1.0:0.6:6.6.

The melting point of the obtained [rice wax 3] was measured by a method similar to the [rice wax 1], and the measurement indicated a melting point of 78° C. As a result of gas chromatography mass spectrometry, it was confirmed that the [rice wax 3] contained a hydrocarbon compound having 20 or more and 30 or less carbon atoms.

The temperature difference between $T_1$ and $T_2$ in the obtained [rice wax 3] was measured by a method similar to the [rice wax 1], and the measurement indicated a temperature difference of 15° C.

<Rice Wax Synthesis Example 4>

A similar method as in the rice wax synthesis example 1 was used to synthesize [rice wax 4], except that the step of adding 1000 mL of ethanol heated to 60° C. in the rice wax synthesis example 1 was changed to a step of adding 1000 mL of ethanol heated to 75° C.

The obtained [rice wax 4] was analyzed by gas chromatography mass spectrometry using a method similar to the [rice wax 1], and the content of a hydrocarbon compound having 2 or more and 16 or less carbon atoms was determined as 2230 ppm in terms of toluene in the [rice wax 4]. The ratio of the peak areas (A:B:C) was 1.0:1.3:1.8.

The melting point of the obtained [rice wax 4] was measured by a method similar to the [rice wax 1], and the measurement indicated a melting point of 77° C. As a result of gas chromatography mass spectrometry, it was confirmed that the [rice wax 4] contained a hydrocarbon compound having 20 or more and 30 or less carbon atoms.

The temperature difference between $T_1$ and $T_2$ in the obtained [rice wax 4] was measured by a method similar to the [rice wax 1], and the measurement indicated a temperature difference of 16° C.

<Rice Wax Synthesis Example 5>

A similar method as in the rice wax synthesis example 1 was used to synthesize [rice wax 5], except that the step of adding 1000 mL of ethanol heated to 60° C. in the rice wax synthesis example 1 was changed to a step of adding 1000 mL of ethanol heated to 50° C.

The obtained [rice wax 5] was analyzed by gas chromatography mass spectrometry using a method similar to the [rice wax 1], and the content of a hydrocarbon compound having 2 or more and 16 or less carbon atoms was determined as 1291 ppm in terms of toluene in the [rice wax 5]. The ratio of the peak areas (A:B:C) was 1.0:3.5:2.6.

The melting point of the obtained [rice wax 5] was measured by a method similar to the [rice wax 1], and the measurement indicated a melting point of 73° C. As a result of gas chromatography mass spectrometry, it was confirmed that the [rice wax 5] contained a hydrocarbon compound having 20 or more and 30 or less carbon atoms.

The temperature difference between $T_1$ and $T_2$ in the obtained [rice wax 5] was measured by a method similar to the [rice wax 1], and the measurement indicated a temperature difference of 18° C.

<Rice Wax Synthesis Example 6>

A similar method as in the rice wax synthesis example 1 was used to synthesize [rice wax 6], except that the step of adding 1000 mL of ethanol heated to 50° C. and stirring by using a homogenizer in the rice wax synthesis example 1 was performed three times.

The obtained [rice wax 6] was analyzed by gas chromatography mass spectrometry using a method similar to the [rice wax 1], and the content of a hydrocarbon compound having 2 or more and 16 or less carbon atoms was determined as 1069 ppm in terms of toluene in the [rice wax 6]. The ratio of the peak areas (A:B:C) was 1.0:4.8:1.4. The melting point of the obtained [rice wax 6] was measured by a method similar to the [rice wax 1], and the measurement indicated a melting point of 71° C. As a result of gas chromatography mass spectrometry, it was confirmed that the [rice wax 6] contained a hydrocarbon compound having 20 or more and 30 or less carbon atoms.

The temperature difference between $T_1$ and $T_2$ in the obtained [rice wax 6] was measured by a method similar to the [rice wax 1], and the measurement indicated a temperature difference of 20° C.

<Rice Wax Synthesis Example 7>

A similar method as in the rice wax synthesis example 1 was used to synthesize [rice wax 7], except that the step of adding 1000 mL of ethanol heated to 45° C. and stirring by using a homogenizer in the rice wax synthesis example 1 was performed four times.

The obtained [rice wax 7] was analyzed by gas chromatography mass spectrometry using a method similar to the [rice wax 1], and the content of a hydrocarbon compound having 2 or more and 16 or less carbon atoms was determined as 920 ppm in terms of toluene in the [rice wax 7]. The ratio of the peak areas (A:B:C) was 1.0:2.9:5.8.

The melting point of the obtained [rice wax 7] was measured by a method similar to the [rice wax 1], and the measurement indicated a melting point of 78° C. As a result of gas chromatography mass spectrometry, it was confirmed that the [rice wax 7] contained a hydrocarbon compound having 20 or more and 30 or less carbon atoms.

The temperature difference between $T_1$ and $T_2$ in the obtained [rice wax 7] was measured by a method similar to the [rice wax 1], and the measurement indicated a temperature difference of 20° C.

TABLE 1

| | Hydrocarbon compound having 2 or more and 16 or less carbon atoms | | | | | |
|---|---|---|---|---|---|---|
| Release agent | Content with respect to release agent (ppm) | Content ratio A of hydrocarbon compound having retention time of 7 minutes or more and less than 8 minutes | Content ratio B of hydrocarbon compound having retention time of 8 minutes or more and less than 9 minutes | Content ratio C of hydrocarbon compound having retention time of 9 minutes or more and less than 10 minutes | Melting point (° C.) | $T_1 - T_2$ (° C.) |
| Rice wax 1 | 3,000 | 1.0 | 5.4 | 10.3 | 75 | 20 |
| Rice wax 2 | 1,500 | 1.0 | 2.9 | 4.7 | 70 | 17 |
| Rice wax 3 | 1,856 | 1.0 | 0.6 | 6.6 | 78 | 15 |
| Rice wax 4 | 2,230 | 1.0 | 1.3 | 1.8 | 77 | 16 |
| Rice wax 5 | 1,291 | 1.0 | 3.5 | 2.6 | 73 | 18 |
| Rice wax 6 | 1,069 | 1.0 | 4.8 | 1.4 | 71 | 20 |
| Rice wax 7 | 920 | 1.0 | 2.9 | 5.8 | 78 | 20 |
| Carnauba wax | 1,300 | 0 | 1.9 | 3.3 | 76 | 18 |

Example 1

<Production of Toner Base Particles>

69 parts by mass of the [amorphous polyester resin], 8 parts by mass of the [crystalline polyester resin], 5 parts by mass of the [rice wax 1] as a release agent, 11 parts by mass of carbon black (#44, manufactured by Mitsubishi Chemical Corp.) as a colorant, and 1 part by mass of an azo iron compound (T-77, manufactured by Hodogaya Chemical Industry Co., Ltd.) as a charge control agent were mixed by using a Henschel mixer (FM20B, manufactured by Mitsui Miike Kakoki Co., Ltd.). Subsequently, the mixture was kneaded at 120° C. by using a twin-screw kneader (PCM-30, manufactured by Ikegai Co., Ltd.) to obtain a kneaded product.

The obtained kneaded product was rolled to a thickness of 2.7 mm by using a roller and then, cooled to room temperature by using a belt cooler, and coarsely pulverized by using a hammer mill to a weight average particle diameter of 200 μm to 300 μm. Next, the resultant particles were finely pulverized by using a supersonic jet pulverizer LABJET (manufactured by Nippon Pneumatic Mfg. Co., Ltd.). Subsequently, the pulverized particles were classified by an air flow classifier (manufactured by Nippon Pneumatic Mfg. Co., Ltd., MDS-I) to obtain a weight average particle diameter of 5.8±0.2 μm, and thus, [toner base particles 1] were obtained.

<Manufacture of Toner>

1.00 part by mass of metal oxide microparticles 1 (trade name: HDK-2000, Clariant Corp.) was added to 100 parts by mass of the [toner base particles 1], and the mixture was stirred and mixed with a Henschel mixer to obtain a [toner 1] to which the metal oxide microparticles 1 were externally added.

<Manufacture of Developer>

5 mass % of the obtained [toner 1] and 95 mass % of a coating ferrite carrier were uniformly mixed for 5 minutes at 48 rpm, by using a TURBULA mixer (manufactured by Willy A. Bachofen (WAB)) to obtain a [developer 1].

Example 2

A [toner 2] was manufactured similarly to Example 1, except that [rice wax 1] as the release agent in Example 1 was changed to [rice wax 2]. A [developer 2] was manufactured similarly as in Example 1.

Example 3

A [toner 3] was manufactured similarly to Example 1, except that [rice wax 1] as the release agent in Example 1 was changed to [rice wax 3]. A [developer 3] was manufactured similarly as in Example 1.

Example 4

A [toner 4] was manufactured similarly to Example 1, except that [rice wax 1] as the release agent in Example 1 was changed to [rice wax 4]. A [developer 4] was manufactured similarly as in Example 1.

Example 5

A [toner 5] was manufactured similarly to Example 1, except that [rice wax 1] as the release agent in Example 1 was changed to [rice wax 5]. A [developer 5] was manufactured similarly as in Example 1.

Example 6

A [toner 6] was manufactured similarly to Example 1, except that [rice wax 1] as the release agent in Example 1 was changed to [rice wax 6]. A [developer 6] was manufactured similarly as in Example 1.

Comparative Example 1

A [toner 7] was manufactured similarly to Example 1, except that [rice wax 1] as the release agent in Example 1 was changed to [rice wax 7]. A [developer 7] was manufactured similarly as in Example 1.

Comparative Example 2

A [toner 8] was manufactured similarly to Example 1, except that [rice wax 1] as the release agent in Example 1 was changed to carnauba wax (manufactured by Toyochem Co., Ltd.). A [developer 8] was manufactured similarly as in Example 1.

Next, each of the obtained toners and developers was evaluated in terms of "filming resistance", "heat-resistant storage stability", and "hot offset property" as described below. The results are illustrated in Table 2.

<Filming Resistance>

The developer was loaded into a housing unit of a copier (RICOH MPC 6003, manufactured by Ricoh Co., Ltd.). In this test, a solid image was formed on a recording medium (Type 6200, manufactured by Ricoh Co., Ltd.) so that an adhesion amount of the developer was 0.4 mg/cm$^2$, and a total of 2000 sheets were continuously printed. After that, a latent image bearer and a charging device were visually observed, and the filming resistance was evaluated based on the following evaluation criteria.

[Evaluation Criteria]

Excellent: No contamination on latent image bearer and no filming on charging device Good: Slight contamination on latent image bearer and filming on charging device Marginal: Slight contamination on latent image bearer and filming on charging device, abnormal images occur over time Poor: Slight contamination on latent image bearer and filming on charging device, abnormal images occur in early stage <Heat-Resistant Storage Stability>

After storing the toner in a temperature environment of 50° C. for 24 hours, a penetrometer (VR-5610, manufactured by Shimadzu Corporation) was used to measure the penetration of the toner in accordance with JIS K2235 (25° C.), and the heat-resistant storage stability was evaluated based on the evaluation criteria described below.

[Evaluation Criteria]

Excellent: Penetration of 4.0 mm or more

Good: Penetration of 1.0 mm or more and less than 4.0 mm

Marginal: Penetration of 0.5 mm or more and less than 1.0 mm

Poor: Penetration less than 0.5 mm

<Hot Offset Property>

The developer was loaded into a housing unit of a copier (RICOH MPC 6003, manufactured by Ricoh Co., Ltd.), and a solid image was formed on a recording medium (Type 6200, manufactured by Ricoh Co., Ltd.) so that an adhesion amount of the developer was 0.4 mg/cm$^2$. The solid images were sequentially output in fixing temperature intervals of 5° C., at a linear speed of the fixing operation of 256 mm/sec and an NIP width of the fixing device of 11 mm, to measure an upper limit temperature at which hot offset does not occur (upper limit of fixing temperature: hot offset property), and the hot offset property was evaluated based on the evaluation criteria described below.

[Evaluation Criteria]

Good: Upper limit of fixing temperature of 200° C. or more

Marginal: Upper limit of fixing temperature of 180° C. or more and less than 200° C.

Poor: Upper limit of fixing temperature less than 180° C.

In the evaluation criteria of each evaluation item, a product having properties of "marginal" or better was evaluated as a good product.

TABLE 2

| | Toner No. | Release agent | Evaluation Result<br>Filming Resistance | Heat-Resistant Storage Stability | Hot Offset Property |
|---|---|---|---|---|---|
| Example 1 | 1 | Rice wax 1 | Excellent | Excellent | Good |
| Example 2 | 2 | Rice wax 2 | Good | Good | Good |
| Example 3 | 3 | Rice wax 3 | Marginal | Good | Good |
| Example 4 | 4 | Rice wax 4 | Marginal | Good | Good |
| Example 5 | 5 | Rice wax 5 | Marginal | Marginal | Good |
| Example 6 | 6 | Rice wax 6 | Marginal | Marginal | Marginal |
| Comparative Example 1 | 7 | Rice wax 7 | Poor | Poor | Good |
| Comparative Example 2 | 8 | Carnauba wax | Poor | Poor | Good |

For example, aspects of the present disclosure include the following.

<1> A toner including a release agent, in which the release agent includes a hydrocarbon compound having 2 or more and 16 or less carbon atoms, a content of the hydrocarbon compound having 2 or more and 16 or less carbon atoms, in the release agent, is 1000 ppm or more in terms of toluene, as determined by gas chromatography mass spectrometry, and the hydrocarbon compound having 2 or more and 16 or less carbon atoms includes a hydrocarbon compound having a retention time of 7 minutes or more and less than 8 minutes determined by the gas chromatography mass spectrometry.

<2> The toner according to <1> described above, in which the release agent further includes a hydrocarbon compound having 20 or more and 30 or less carbon atoms.

<3> The toner according to any one of <1> and <2> described above, in which the hydrocarbon compound having 2 or more and 16 or less carbon atoms further includes:

a hydrocarbon compound having a retention time of 8 minutes or more and less than 9 minutes determined by the gas chromatography mass spectrometry; and a hydrocarbon compound having a retention time of 9 minutes or more and less than 10 minutes determined by the gas chromatography mass spectrometry, wherein the toner satisfies the following expressions (1) and (2):

$$A<B<C \quad \text{expression (1)}$$

$$2A<C \quad \text{expression (2)}$$

where A is a peak area of a peak of the hydrocarbon compound having a retention time of 7 minutes or more and less than 8 minutes, B is a peak area of a peak of the hydrocarbon compound having a retention time of 8 minutes or more and less than 9 minutes, and C is a peak area of a peak of the hydrocarbon compound having a retention time of 9 minutes or more and less than 10 minutes.

<4> The toner according to any one of <1> to <3> described above, in which the release agent has a melting point of 75° C. or higher.

<5> The toner according to any one of <1> to <4> described above, in which, in a DSC curve of the release agent measured by a differential scanning calorimeter, a maximum endothermic peak $P_1$ is located in a region from 70° C. to 90° C., both inclusive, and a difference ($T_1$-$T_2$) between a temperature $T_1$ and a temperature $T_2$ is 10° C. or more, where $T_1$ is a maximum endothermic peak temperature indicating the maximum endothermic peak $P_1$, and $T_2$ is a temperature that is lower than the maximum endothermic peak temperature $T_1$ and is a temperature at a depth of 10% of the maximum endothermic peak depth.

<6> The toner according to any one of <1> to <5> described above, in which the release agent is a rice wax.

<7> A developer including the toner according to any one of <1> to <6> described above.

<8> A toner housing unit including a housing container and the toner according to any one of <1> to <6> described above housed in the housing container.

<9> An image forming apparatus, including:

an electrostatic latent image bearer, an electrostatic latent image forming unit configured to form an electrostatic latent image on the electrostatic latent image bearer, a developing unit housing a developer and configured to develop the electrostatic latent image by using the developer to form a visible image, a transfer unit that transfers the visible image onto a recording medium, and a fixing unit that fixes the transferred visible image onto the recording medium, in which the developer includes the toner according to any one of <1> to <6> described above.

<10> An image forming method, including:

forming an electrostatic latent image on an electrostatic latent image bearer, developing the electrostatic latent image by using a developer to form a visible image, transferring the visible image onto a recording medium, and fixing the transferred visible image onto the recording medium, in which the developer includes the toner according to any one of <1> to <6> described above.

According to the toner according to any one of <1> to <6> described above, the developer according to <7> described above, the toner housing unit according to <8> described above, the image forming method according to <9> described above, and the image forming apparatus according to <10> described above, it is possible to solve various conventional problems and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A powder developer comprising:

a carrier including a core material and a resin layer covering the core material;

toner including:

a colorant;

a polyester resin, and a release agent, the release agent including a hydrocarbon compound having 2 or more and 16 or less carbon atoms, a content of the hydrocarbon compound having 2 or more and 16 or less carbon atoms, in the release agent, being 1000 ppm or more in terms of toluene, as determined by gas chromatography mass spectrometry, the hydrocarbon compound having 2 or more and 16 or less carbon atoms including a hydrocarbon compound having a retention time of 7 minutes or more and less than 8 minutes determined by the gas chromatography mass spectrometry, wherein the gas chromatography mass spectrometry is performed under the following conditions:

heat extraction condition: 150° C./5 min, temperature of interface portion: 250° C., injection temperature: 150° C., carrier gas (mobile phase): He, flow rate of carrier gas: 1.0 mL/min, ionization method: electron ionization (EI) method (70 eV), injection mode: Split (1:100), oven temperature: 50° C. (retention: 2 min), 320° C. (retention: 10 min), heating rate: 15° C./min, and the content is determined in terms of toluene by using a calibration curve of toluene.

2. The powder developer according to claim 1, wherein the release agent further includes a hydrocarbon compound having 20 or more and 30 or less carbon atoms.

3. The powder developer according to claim 1, wherein the hydrocarbon compound having 2 or more and 16 or less carbon atoms further includes:

a hydrocarbon compound having a retention time of 8 minutes or more and less than 9 minutes determined by the gas chromatography mass spectrometry; and a hydrocarbon compound having a retention time of 9 minutes or more and less than 10 minutes determined by the gas chromatography mass spectrometry, wherein the toner satisfies the following expressions (1) and (2):

$$A<B<C \quad \text{expression (1)}$$

$$2A<C \quad \text{expression (2)}$$

where A is a peak area of a peak of the hydrocarbon compound having a retention time of 7 minutes or more and less than 8 minutes, B is a peak area of a peak of the hydrocarbon compound having a retention time of 8 minutes or more and less than 9 minutes and C is a peak area of a peak of the hydrocarbon compound having a retention time of 9 minutes or more and less than 10 minutes.

4. The powder developer according to claim 1, wherein the release agent has a melting point of 75° C. or higher.

5. The powder developer according to claim 1, wherein, in a DSC curve of the release agent measured by a differential scanning calorimeter, a maximum endothermic peak $P_1$ is in a region from 70° C. to 90° C., both inclusive, and a difference $(T_1-T_2)$ between a temperature $T_1$ and a temperature $T_2$ is 10° C. or more, $T_1$ being a maximum endothermic peak temperature indicating the maximum endothermic peak $P_1$, and $T_2$ being a temperature lower than the maximum endothermic peak temperature $T_1$ and at a depth of 10% of a maximum endothermic peak depth.

6. The powder developer according to claim 1, wherein the release agent includes a rice wax.

7. An image forming apparatus, comprising:

an electrostatic latent image bearer;

an electrostatic latent image former to form an electrostatic latent image on the electrostatic latent image bearer;

a developer housing a developer and to develop the electrostatic latent image by using the powder developer according to claim 1 to form a visible image;

a transferer to transfer the visible image onto a recording medium; and a fixer to fix the transferred visible image onto the recording medium.

8. An image forming method, comprising:

forming an electrostatic latent image on an electrostatic latent image bearer;

developing the electrostatic latent image by using the powder developer according to claim 1 to form a visible image;

transferring the visible image onto a recording medium; and fixing the transferred visible image onto the recording medium.

9. The powder developer according to claim 1, wherein:

the colorant is carbon black.

10. The powder developer according to claim 1, wherein:

a content of the release agent is from 2 mass % to 10 mass % with respect to the toner.

11. The powder developer according to claim 1, further comprising:

a charge control agent.

12. The powder developer according to claim 11, wherein:

the charge control agent is an azo iron compound.

13. The powder developer according to claim 1, further comprising:

an external additive.

14. The powder developer according to claim 13, wherein:

the external additive is selected from the group consisting of hydrophobic silica, titania, and alumina.

15. The image forming apparatus according to claim 7, wherein:

the transferer comprises an intermediate transfer body to receive the visible image from the electrostatic latent image bearer and transfer the visible image onto the recording medium.

16. The powder developer according to claim 1, wherein:

the toner comprises a crystalline polyester resin.

* * * * *